(12) United States Patent
Porten et al.

(10) Patent No.: US 8,181,625 B2
(45) Date of Patent: May 22, 2012

(54) METHOD FOR OPERATING AN INTERNAL COMBUSTION ENGINE

(75) Inventors: Guido Porten, Vaihingen/Enz (DE); Ruediger Weiss, Moetzingen (DE); Markus Amler, Leonberg-Gebersheim (DE); Juergen Raimann, Weil Der Stadt (DE); Peter Schenk, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 526 days.

(21) Appl. No.: 12/225,843

(22) PCT Filed: Mar. 15, 2007

(86) PCT No.: PCT/EP2007/052440
§ 371 (c)(1),
(2), (4) Date: Apr. 1, 2009

(87) PCT Pub. No.: WO2007/115892
PCT Pub. Date: Oct. 18, 2007

(65) Prior Publication Data
US 2009/0210132 A1 Aug. 20, 2009

(30) Foreign Application Priority Data
Apr. 5, 2006 (DE) .......................... 10 2006 016 037

(51) Int. Cl.
*F02B 17/00* (2006.01)

(52) U.S. Cl. .......................... 123/294; 123/299; 123/305

(58) Field of Classification Search ................... 123/294, 123/295, 299, 305
See application file for complete search history.

(56) References Cited

U.S. PATENT DOCUMENTS

| 4,621,599 | A | 11/1986 | Igashira et al. | |
| 7,204,228 | B2 * | 4/2007 | Oechsle et al. | 123/299 |
| 7,353,799 | B2 * | 4/2008 | Brachert et al. | 123/299 |
| 2004/0025829 | A1 * | 2/2004 | Wuerfel | 123/295 |
| 2006/0000440 | A1 * | 1/2006 | Kohler et al. | 123/295 |
| 2007/0023003 | A1 | 2/2007 | Oechsle et al. | |

FOREIGN PATENT DOCUMENTS

| DE | 199 36 201 | 2/2001 |
| DE | 10 2004 017 989 | 3/2005 |
| JP | 60-125748 | 7/1985 |
| WO | WO 2004/027237 | 4/2004 |
| WO | WO 2005/100768 | 10/2005 |

OTHER PUBLICATIONS

Die neue Emissionsstrategie der Benzin-Direkteinspritzung ("The new emissions strategy of direct gasoline injection"), MTZ Nov. 2003, pp. 916-923. (Will provide later).

* cited by examiner

*Primary Examiner* — John Kwon
(74) *Attorney, Agent, or Firm* — Kenyon & Kenyon LLP

(57) ABSTRACT

In an internal combustion engine, fuel is directly injected into at least one combustion chamber at least during a compression stroke in such a way that a stratified mixture is present in the combustion chamber. This mixture is then externally ignited. The fuel is introduced during the compression stroke by at least one main injection and an ignition injection, the ignition injection taking place immediately before an ignition and producing at least essentially no torque.

10 Claims, 3 Drawing Sheets

METHOD FOR OPERATING AN INTERNAL COMBUSTION ENGINE

BACKGROUND OF THE INVENTION

1. Field of the Invention

The present invention relates to a method and a control device for operating an internal combustion engine.

2. Description of Related Art

In the article "Die neue Emissionsstrategie der Benzin-Direkteinspritzung" ("The new emissions strategy of direct gasoline injection"), MTZ 11/2003, pp. 916-923, the possibility of a "stratified start" is described. In contrast to a homogenous low-pressure start, in which injection takes place during an intake stroke, in a stratified start the injection does not take place until late during the compression stroke. This results in a stratified fuel-air mixture having a rich mixture cloud in the area of the spark plug.

The advantage of such a stratified start in comparison with a conventional low-pressure start is that, above all at low ambient and engine temperatures, a lower enrichment is required, which improves the emission characteristic of the internal combustion engine. Such an enrichment is required because during startup a portion of the injected fuel adheres to the cold combustion chamber walls as a film, and thus does not fully take part in the actual combustion during the start phase. The fuel that remains uncombusted in this way is ejected without being combusted and results in undesirable hydrocarbon emissions. In order to compensate the fuel mass that does not participate in the combustion, the injected quantity must be correspondingly increased. Given a homogenous low-pressure start, enrichment factors of 2 to 3 over the stoichiometric quantity are not unusual.

After the stratified start phase, which usually lasts approximately 1 to 2 seconds, i.e. after the very first injections and ignitions, a catalytic converter heating phase takes place during which a homogenous split injection is carried out. In the above-named article, concerning this it is proposed that a first injection take place during the intake stroke, producing a lean homogenous base mixture in the combustion chamber. There then follows a second injection during the subsequent compression stroke, which provides a rich mixture cloud in the area of the spark plug. The ignition takes place relatively late, shortly after top dead center, between the compression stroke and the following expansion stroke. In this way, a late center of the combustion is realized, with the result that a large part of the released energy is not converted into mechanical energy, but rather is released in the exhaust gas as heat. This enables a very rapid heating of a catalytic converter. The production of the charge stratification is in both cases preferably produced by a spray-guided method.

From published German patent document DE 10 2004 017 989, it is known, in operation with a very lean charge mixture, to make a pre-injection during an intake stroke and to make a main injection during a compression stroke immediately before ignition. However, here the mixture preparation is not optimal.

BRIEF SUMMARY OF THE INVENTION

An object of the present invention is to provide a method for operating an externally ignited internal combustion engine having direct fuel injection, with which the emissions and the fuel consumption can be reduced.

In the method according to the present invention, a reliable ignition can be ensured even given the most various and lean charge stratifications in the combustion chamber. In this way, the operating range of the internal combustion engine is significantly expanded without fear of ignition misses. The actual torque-producing main injection can however in addition be set to that injection angle during the compression stroke at which a desired charge stratification and mixture preparation is best ensured. This simultaneously reduces emissions and consumption. The quantity of the main injection (which can also be introduced by a multiple injection) is significantly greater than the quantity of the ignition injection. The ignition injection itself is so small that it does not contribute, or at least does not contribute significantly, to the torque of the internal combustion engine, and also does not significantly increase fuel consumption. With this injection, a mixture is produced only in a very small area directly at the spark plug that is so rich that an "ignition torch" results in the combustion chamber that can reliably ignite the rest of the mixture, which in the normal case is lean.

The ignition injection takes place immediately before the ignition, before top dead center between the compression and expansion stroke has been reached. "Immediately" means that the distance, expressed in degrees of crank angle (° CA), with a maximum of approximately 5° CA, is preferably only approximately 1° CA. If necessary, the ignition and the ignition injection can also take place simultaneously. The ignition angle is standardly in the area of a crank angle of approximately 15° CA before top dead center, i.e. still in the compression stroke.

Through the method according to the present invention, in particular at low ambient temperatures the fuel enrichment required for a reliable stratified start can be further reduced, which has a favorable effect in particular on the hydrocarbon emissions of the start phase. It is even possible to realize a stratified start with a lean start lambda. For example, at an engine temperature of approximately 20° C. the internal combustion engine can be lean-started with a lambda value of 1 to 1.5; given an optimized combustion method a lambda value >2 is even possible. The start lambda to be realized is advantageously a function of various parameters in addition to engine temperature, e.g. fuel quality, ambient temperature, etc. Through the method according to the present invention, during the start phase the combustion is also improved, i.e. stabilized, which also has a favorable effect on the level of emissions during the start phase. In addition, an internal combustion engine operated in this way has increased robustness relative to different fuel qualities. The start behavior when "poor fuel" is supplied is thus more reliable.

This is realized in that during the start phase, i.e. during the very first injections or rotations of the crankshaft, during the compression stroke at least one main injection is made, preferably at a crank angle of approximately 80-30° CA before top dead center between the compression stroke and the expansion stroke. This injection injects fuel into the pre-compressed and thus pre-heated air in the combustion chamber. The ignition injection takes place subsequently.

In addition, it is advantageous if, after the end of the start phase, a catalytic converter heating phase is carried out with a homogenous split injection and with an ignition angle that is situated in the expansion stroke, i.e. after top dead center between the compression stroke and the expansion stroke. This is because the transition between the start phase and the catalytic converter heating phase can be realized essentially only by a preferably continuous late setting of the ignition angle, which can be easily applied and can be carried out in such a way that the torque produced by the internal combustion engine is not influenced thereby, or at least not noticeably.

In order to trigger the ignition injection, only a small amount of computing capacity is required if this injection, preferably the end thereof, is coupled at least indirectly to the crank angle of the ignition.

Here, the interval between the ignition injection and the ignition can be at least at times rigid, which further conserves resources. However, a better emission and start behavior is achieved if the interval between the ignition injection and the ignition is a function, at least at times, of at least one state quantity (e.g. number of injections) of the internal combustion engine.

It is preferable if in addition at least one injection takes place during an intake stroke, e.g., at a crank angle in the area of approximately 280° CA before the top dead center between the compression stroke and the expansion stroke. In this way, preferably during the start phase a method is realized that corresponds to a combination of a high-pressure stratified start method and a homogenous split injection method. In this way, the advantages of a spray-guided homogenous split injection can be exploited already during the start phase, i.e. without the otherwise standard late injection angle required for the heating of a catalytic converter. Such a method is distinguished by a particularly robust combustion with simultaneous low emissions. Such a method can also help avoid engine knock.

The emissions level can be further reduced if the parameters that characterize the start phase are not rigid, but rather are a function of environmental state quantities and/or operating quantities of the internal combustion engine. In particular, the partitioning of the injected quantity and/or the crank angle of the injections can be a function of at least one environmental state quantity, in particular of an ambient temperature and/or of an intake air temperature, and/or of at least one operating quantity of the internal combustion engine, in particular of a relative charge and/or of a temperature of a component of the internal combustion engine, and/or of an ignition angle.

DETAILED DESCRIPTION OF THE INVENTION

Figure 1:
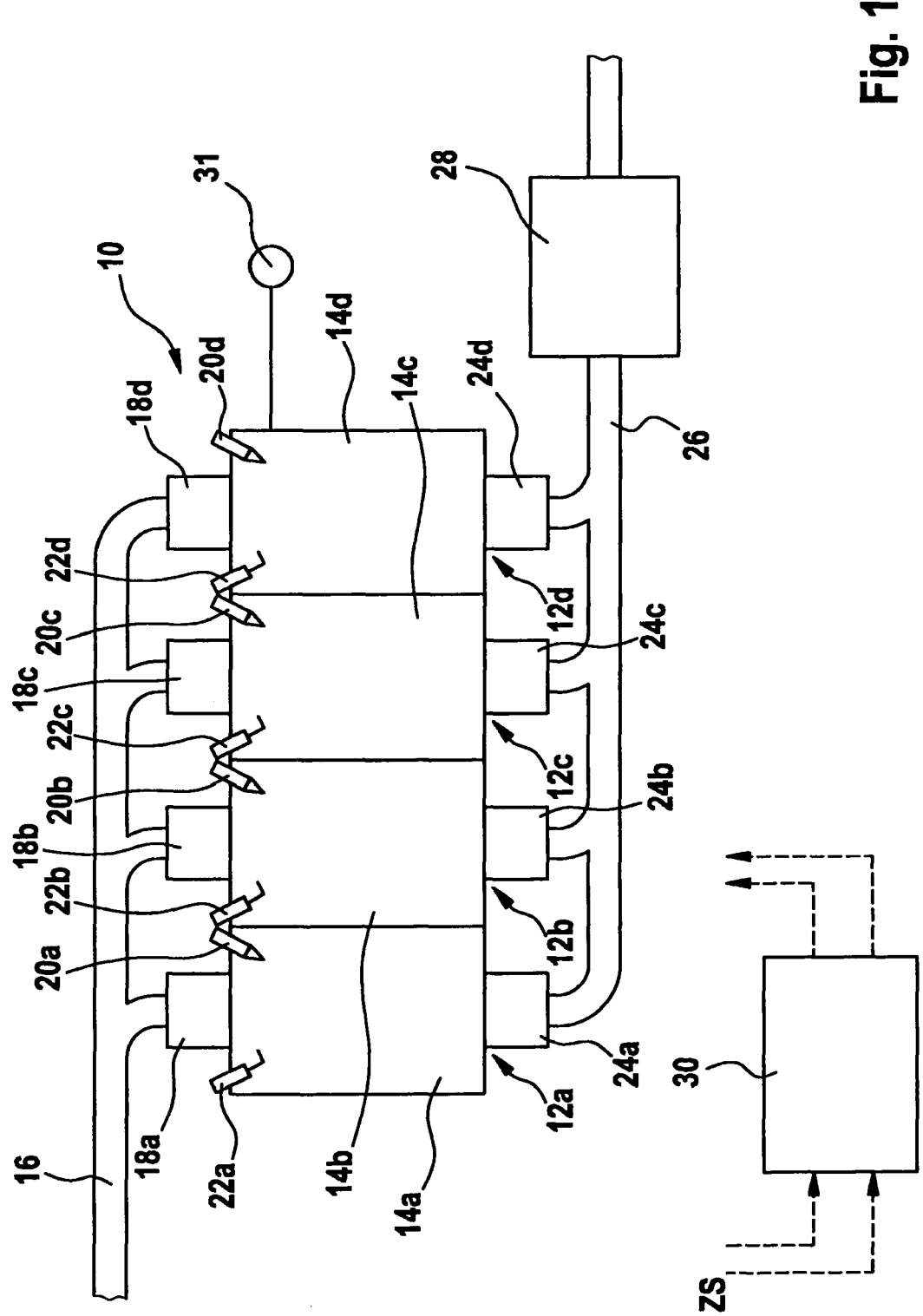
FIG. 1 shows a schematic representation of an internal combustion engine having a plurality of cylinders, each having a combustion chamber.
Figure 2:
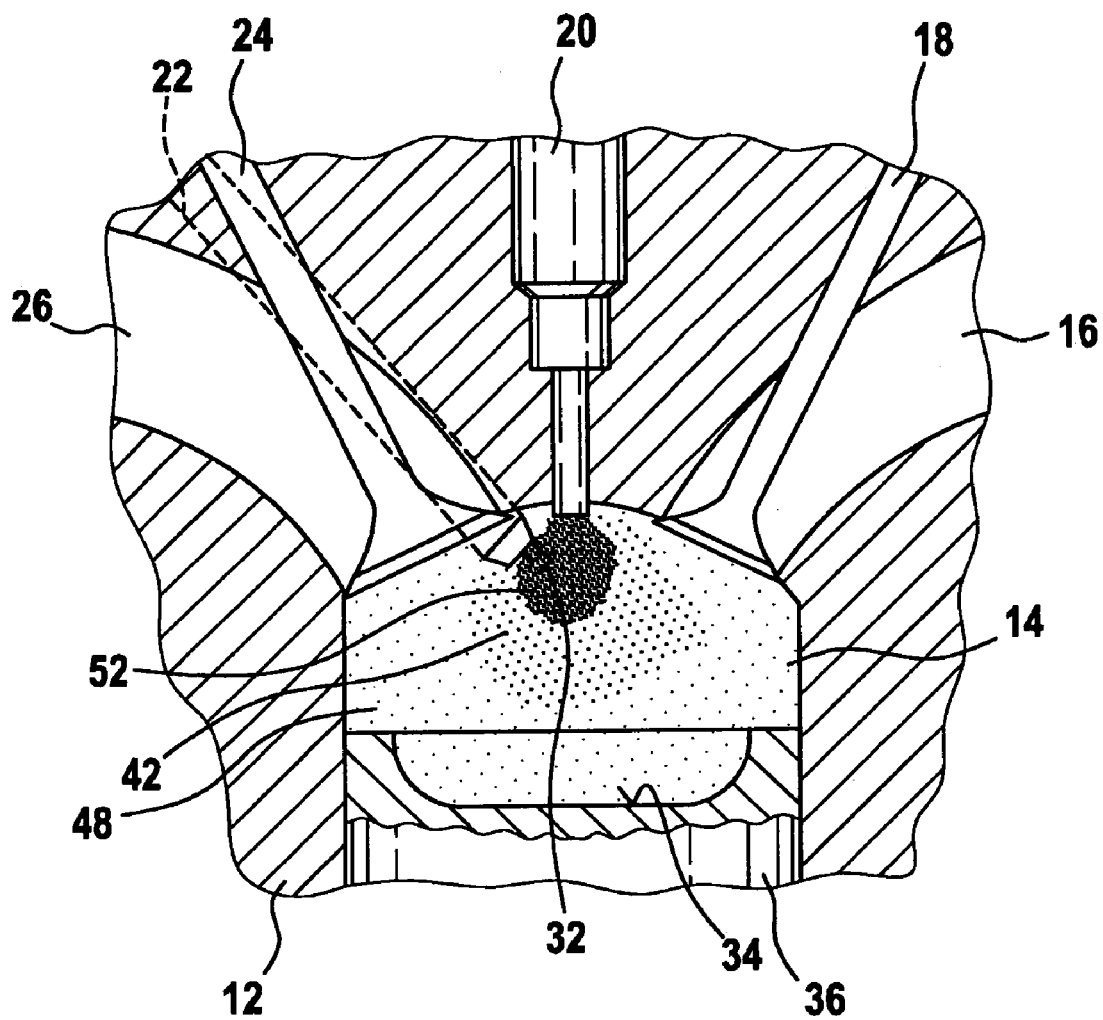
FIG. 2 shows a partial section through an area of a cylinder of the internal combustion engine of FIG. 1.

In FIG. 1, an internal combustion engine is designated 10 as a whole. It is used to drive a motor vehicle (not shown), and comprises four essentially identical cylinders 12a to 12d having corresponding combustion chambers 14a to 14d. In FIG. 2, one cylinder 12 is shown in more detail as an example (if a reference character does not include the index a-d, this means, here and in the following, that the statements hold correspondingly for all similar components a-d).

Combustion air enters combustion chambers 14a to 14d via an intake pipe 16 and intake valves 18a to 18d. Fuel is injected into combustion chambers 14a to 14d by a respective injector 20a to 20d. Injectors 20a to 20d are connected to a rail (not shown) in which fuel is stored under high pressure. The fuel is predominantly gasoline, and the internal combustion engine shown in FIG. 1 is therefore an engine that operates with gasoline direct injection (GDi). However, it is also possible to use a gaseous fuel, biofuel, or a synthetic fuel.

The fuel/air mixture in combustion chambers 14a to 14d is ignited in each case by a spark plug 22a to 22d. The hot combustion exhaust gases are conducted away from combustion chambers 14a to 14d via outlet valves 24a to 24d, into an exhaust pipe 26. This pipe leads to a catalytic converter 28 that converts pollutants in the exhaust gas, thus cleaning the exhaust gas.

The operation of internal combustion engine 10 is regulated by a control and regulating device 30 that obtains signals from various sensors and actuators (not shown in FIG. 1) via which certain state quantities ZS of internal combustion engine 10 are acquired. These include for example a gas pedal sensor with which a user of internal combustion engine 10 can express a desired torque.

These sensors also include temperature sensors that acquire for example the temperature of a cylinder head and/or of a coolant of internal combustion engine 10 or of intake air flowing through intake pipe 16, an HFM (air mass) sensor that acquires the air mass flowing into combustion chambers 14a to 14d via intake pipe 16, and lambda sensors that are situated in the area of catalytic converter 28 and that acquire the ratio of the fuel/air mixture in combustion chambers 14a to 14d. Such a sensor is shown as an example in FIG. 1, designated 31. Control and regulator device 30 controls for example injectors 20, spark plugs 22, and a throttle valve (not shown in FIG. 1) in intake pipe 16.

As can be seen in particular in FIG. 2, internal combustion engine 10 realizes what is known as a "spray-guided" combustion method. In such a method, injector 20 is preferably centrally situated. Electrodes 32 of spark plug 22 are standardly situated relatively close to injector 20. A piston base 34 of a piston 36 has a design that supports the charge stratification.

Figure 3:
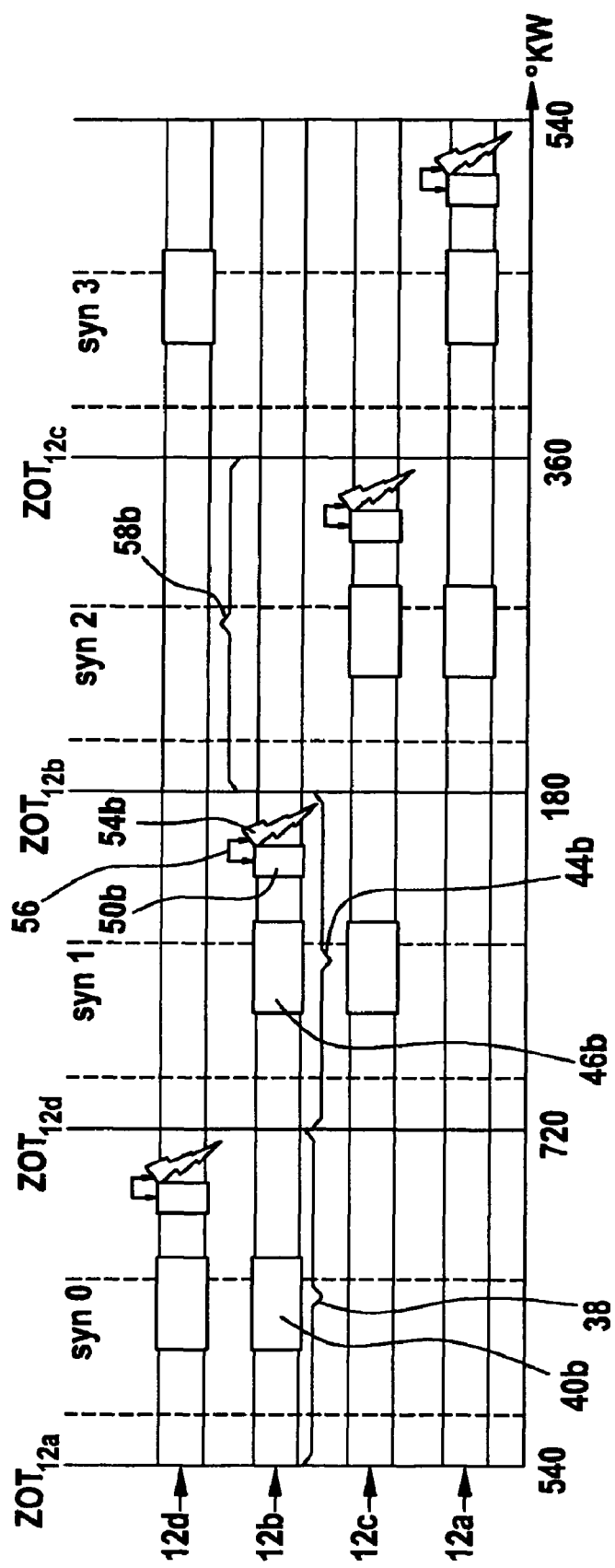
FIG. 3 shows a diagram in which fuel injections and ignitions of the individual cylinders of FIG. 1 are plotted over a crank angle.

A stratified start method is used to start internal combustion engine 10 in the present case. This method is now explained with reference in particular to FIG. 3. In FIG. 3, the individual strokes of a work cycle for each cylinder 12a to 12d are shown over the crank angle (° CA) of a crankshaft (not shown in FIGS. 1 and 2) of internal combustion engine 10. The top dead centers, situated in each case between a compression stroke and an expansion stroke, of a cylinder 12 are designated $ZOT_{12a}$ to $ZOT_{12d}$. As an example, cylinder 12b will now be used to explain the injection strategy realized during the start phase of internal combustion engine 10, i.e. during the very first injections and combustions or revolutions of the crankshaft of internal combustion engine 10. However, the same holds in principle for the other cylinders 12a, 12c, and 12d as well.

During an intake stroke 38 of cylinder 12b, injector 20 emits a pre-injection 40b into combustion chamber 14b in the area of a crank angle of approximately 300-260° CA, preferably approximately 280° CA before top dead center $ZOT_{12b}$. This pre-injection 40b produces a base mixture in combustion chamber 14b that is homogenous as a whole, i.e. is distributed uniformly in combustion chamber 12b, and that is very lean, designated by reference character 42 in FIG. 2. In a subsequent compression stroke 44b, in the area of a crank angle of approximately 80-30° CA, preferably approximately 50° CA, before top dead center $ZOT_{12b}$ a first injection 46b, called the main injection, is emitted into combustion chamber 14b. In this way, a mixture cloud is produced in the center of combustion chamber 14b that is richer than the homogenous lean base mixture 42; the cloud is designated 48 in FIG. 2. Towards the end of compression stroke 44b, injector 20 makes a second injection 50b, called the ignition injection, into combustion chamber 14b. In this way, in a limited local area around electrodes 32 of spark plug 22, a comparatively rich and small local mixture cloud is produced, designated 52 in FIG. 2.

This ignition injection 50 takes place during the compression stroke and immediately (maximum approximately 5° CA, preferably only approximately 1° CA) before a subsequent ignition (reference character 54b in FIG. 3), carried out in the area of a crank angle of approximately 20-10° CA, preferably approximately 15° CA, before top dead center $ZOT_{12b}$. If warranted, the ignition injection and the ignition can also occur simultaneously. The crank angle of the end of ignition injection 50 is temporally coupled to the crank angle of ignition 54 ("ignition angle"). This is represented in FIG. 3 by a double arrow designated 56. This coupling can be rigid or variable, the latter being a function of current state quantities ZS of internal combustion engine 10. The exact interval between ignition injection 50b and ignition 54b can be pre-specified for example by a characteristic field.

The partition of the injected quantity between pre-injection 40b, main injection 46b, and ignition injection 50b, as well as the crank angle of pre-injection 40b and main injection 46b, are determined by control and regulating device 30 as a function of an engine temperature, an ambient temperature, an engine rotational speed, and an intake air temperature, as well as of a relative charge, a temperature of the cylinder head of internal combustion engine 10, and the crank angle of ignition 54b (ignition angle).

In the example embodiment according to FIG. 3, during the start phase a pre-injection 40 is made during intake stroke 38. In an exemplary embodiment that is not shown, this pre-injection does not occur. In a corresponding method, therefore, only main injection 46b and ignition injection 50b take place during compression stroke 44b.

The injection strategy shown in FIG. 3 is applied during the start phase, i.e. during the very first rotations of the crankshaft of internal combustion engine 10. Subsequently, a transition is made to a homogenous split injection in which, for the example of cylinder 12b during expansion stroke 58b, the ignition angle is situated after top dead center $ZOT_{12b}$. This late adjustment of the ignition angle moves the combustion center to a later time, resulting in an increase in the exhaust gas temperature and therefore an improved heating of catalytic converter 28. Detailed explanations of homogenous split injection can be found in the article "Die neue Emissionsstrategie der Benzin-Direkteinspritzung" ("The new emissions strategy of direct gasoline injection"), MTZ 11/2003, pp. 916-923, whose disclosure is hereby expressly incorporated into the subject matter of the present specification.

What is claimed is:

1. A method for operating an internal combustion engine, comprising:
    injecting fuel directly into at least one combustion chamber of the internal combustion engine at least during a compression stroke in such a way that a stratified mixture is present in the combustion chamber; and
    externally igniting the stratified mixture;
    wherein:
    fuel is introduced during the compression stroke by at least one main injection and an ignition injection, and wherein the ignition injection takes place immediately before the ignition of the stratified mixture,
    the quantity of the ignition injection is significantly smaller than quantity of the at least one main injection, and
    the method is applied during a start phase for a stratified start of the internal combustion engine.

2. The method as recited in claim 1, wherein after the end of the start phase, a catalytic converter heating phase is carried out with a homogenous split injection at a crank angle of the ignition that is situated after the top dead center between the compression stroke and an expansion stroke.

3. The method as recited in claim 2, wherein the ignition injection is at least indirectly dependent on the crank angle of the ignition.

4. The method as recited in claim 3, wherein, for at least a selected period of engine operation, an interval between the ignition injection and the ignition of the stratified mixture is fixed.

5. The method as recited in claim 3, wherein, for at least a selected period of engine operation, an interval between the ignition injection and the ignition of the stratified mixture is a function of at least one state quantity of the internal combustion engine.

6. The method as recited in claim 3, further comprising:
    providing at least one pre-injection during an intake stroke in the area of a crank angle of approximately 300-260°, before the top dead center between the compression stroke and the expansion stroke.

7. The method as recited in claim 6, wherein at least one of: a) partition of injected quantities fuel among the pre-injection, main injection and ignition injection; and b) the crank angles of the pre-injection, main injection and ignition injection, is a function of at least one of an environmental state quantity and an operating quantity of the internal combustion engine.

8. A computer-readable data storage medium for storing a computer program having program codes which, when executed on a computer, controls a method for operating an internal combustion engine, the method comprising:
    injecting fuel directly into at least one combustion chamber of the internal combustion engine at least during a compression stroke in such a way that a stratified mixture is present in the combustion chamber; and
    externally igniting the stratified mixture;
    wherein fuel is introduced during the compression stroke by at least one main injection and an ignition injection, which is significantly smaller than the at least one main injection, the ignition injection takes place immediately before the ignition of the stratified mixture, the method is applied during a start phase for a stratified start of the internal combustion engine, and after the end of the start phase, a catalytic converter heating phase is carried out with a homogenous split injection at a crank angle of the ignition that is situated after the top dead center between the compression stroke and an expansion stroke.

9. A control device for an internal combustion engine, comprising:
    a means for controlling injection of fuel directly into at least one combustion chamber of the internal combustion engine at least during a compression stroke in such a way that a stratified mixture is present in the combustion chamber; and
    a means for controlling ignition of the stratified mixture, wherein the stratified mixture is externally ignited;
    wherein fuel is introduced during the compression stroke by at least one main injection and an ignition injection, which is significantly smaller than the at least one main injection, the ignition injection takes place immediately before the ignition of the stratified mixture, the method is applied during a start phase for a stratified start of the internal combustion engine, and after the end of the start phase, a catalytic converter heating phase is carried out with a homogenous split injection at a crank angle of the ignition that is situated after the top dead center between the compression stroke and an expansion stroke.

10. The method as recited in claim 1, wherein the quantity of the ignition injection is small enough that it does not contribute significantly to the torque of the internal combustion engine.

* * * * *